US008147779B2

(12) United States Patent
Abuyima et al.

(10) Patent No.: US 8,147,779 B2
(45) Date of Patent: Apr. 3, 2012

(54) METHOD OF ALKALI PROCESSING SUBSTANCE CONTAINING ARSENIC

(75) Inventors: Mitsuo Abuyima, Tokyo (JP); Yusuke Sato, Akita (JP); Hironobu Mikami, Akita (JP); Masami Oouchi, Tokyo (JP); Tetsuo Fujita, Tokyo (JP); Masayoshi Matsumoto, Tokyo (JP)

(73) Assignee: Dowa Metals & Minning Co., Ltd., Tokyo (JP)

( * ) Notice: Subject to any disclaimer, the term of this patent is extended or adjusted under 35 U.S.C. 154(b) by 0 days.

(21) Appl. No.: 12/452,586

(22) PCT Filed: Jul. 11, 2008

(86) PCT No.: PCT/JP2008/062619
§ 371 (c)(1),
(2), (4) Date: Mar. 29, 2010

(87) PCT Pub. No.: WO2009/011320
PCT Pub. Date: Jan. 22, 2009

(65) Prior Publication Data
US 2010/0215570 A1    Aug. 26, 2010

(30) Foreign Application Priority Data

Jul. 13, 2007   (JP) .................................. 2007-185072
Mar. 10, 2008   (JP) .................................. 2008-059366

(51) Int. Cl.
C01G 49/00    (2006.01)

(52) U.S. Cl. ...................................... 423/87; 423/594.1
(58) Field of Classification Search ..................... 423/87, 423/594.1
See application file for complete search history.

(56) References Cited

U.S. PATENT DOCUMENTS

| 4,244,927 A * | 1/1981 | Reynolds et al. ............... 423/87 |
| 4,572,822 A | 2/1986 | Abe et al. |
| 5,126,116 A | 6/1992 | Krause et al. |
| 5,135,223 A | 8/1992 | You |
| 5,449,503 A | 9/1995 | Redmon et al. |
| 2003/0192404 A1 | 10/2003 | Jones |

FOREIGN PATENT DOCUMENTS

| JP | A-58-24378 | 2/1983 |
| JP | A-58-141346 | 8/1983 |
| JP | B2 61-24329 | 6/1986 |
| JP | A-62-182252 | 8/1987 |
| JP | A-4-238816 | 8/1992 |
| JP | A-6-25763 | 2/1994 |
| JP | A-9-110428 | 4/1997 |
| JP | A 9-241776 | 9/1997 |
| JP | A-9-315819 | 12/1997 |
| JP | A-11-47764 | 2/1999 |
| JP | A 2000-219920 | 8/2000 |
| JP | A-2003-137552 | 5/2003 |
| JP | A-2004-307965 | 11/2004 |
| JP | A 2005-161123 | 6/2005 |
| JP | A-2006-116468 | 5/2006 |
| JP | A-2006-198448 | 8/2006 |
| JP | A 2006-328498 | 12/2006 |

OTHER PUBLICATIONS

Nishimura et al., "On the Solubility Products of Ferric, Calcium and Magnesium Arsenates," Bulletin of the Research Institute of Mineral Dressing and Metallurgy, vol. 34, No. 1, Jun. 1978, pp. 19-26. (with English-language abstract).
Krause et al., "Solubilities and Stabilities of Ferric Arsenate Compounds," Hydrometallurgy, vol. 22, 1989, pp. 311-337.
Filippou et al., "Arsenic Immobilization by Controlled Scordite Precipitation," JOM, vol. 49, No. 12, 1997, pp. 52-55.
International Search Report issued in corresponding International Search Report PCT/JP2008/062619, mailed Aug. 19, 2008. (with English-language translation).
International Search Report issued in International Application No. PCT/JP2008/062610 on Oct. 14, 2008. (with English-language translation).
International Search Report issued in International Application No. PCT/JP2008/062611 on Oct. 14, 2008. (with English-language translation).
International Search Report issued in International Application No. PCT/JP2008/062615 on Aug. 19, 2008. (with English-language translation).
International Search Report issued in International Application No. PCT/JP2008/062617 on Oct. 21, 2008. (with English-language translation).
Written Opinion of the International Searching Authority issued on Feb. 9, 2010 in corresponding International Application No. PCT/JP2008/062610.
Written Opinion of the International Searching Authority issued on Feb. 9, 2010 in corresponding International Application No. PCT/JP2008/062611.
Written Opinion of the International Searching Authority issued on Feb. 9, 2010 in corresponding International Application No. PCT/JP2008/062615.
Written Opinion of the International Searching Authority issued on Feb. 24, 2010 in corresponding International Application No. PCT/JP2008/062617.
Written Opinion of the International Searching Authority issued on Feb. 9, 2010 in corresponding International Application No. PCT/JP2008/062619.

(Continued)

Primary Examiner — Steven Bos
(74) Attorney, Agent, or Firm — Oliff & Berridge, PLC

(57) ABSTRACT

To provide a method of generating, with good reproducibility and ease and without complicated operations, scorodite which satisfies the elution standard (in accordance with Notification of No. 13 of Japanese Environment Agency) and which has good filterbility and stability for processing arsenic contained in a non-ferrous smelting intermediate, particularly, for processing a diarsenic trioxide form. A method of processing diarsenic trioxide, including: a leaching step of adding water and alkali to a non-ferrous smelting intermediate that contains diarsenic trioxide to produce slurry, heating the slurry, and leaching arsenic; a solution adjusting step of adding an oxidizing agent to the leachate to oxidize trivalent arsenic to pentavalent arsenic so as to obtain an adjusted solution; and a crystallizing step of converting arsenic in the adjusted solution to scorodite crystal.

5 Claims, 4 Drawing Sheets

OTHER PUBLICATIONS

U.S. Appl. No. 12/452,509, filed Mar. 18, 2010 in the name of Mitsuo Abumiya et al.
U.S. Appl. No. 12/452,534, filed Mar. 24, 2010 in the name of Mitsuo Abumiya et al.
U.S. Appl. No. 12/452,593, filed Jan. 11, 2010 in the name of Mitsuo Abumiya et al.
U.S. Appl. No. 12/452,586, filed Mar. 29, 2010 in the name of Mitsuo Abumiya et al.
U.S. Appl. No. 12/452,686, filed Apr. 15, 2010 in the name of Mitsuo Abumiya.
Weert et al., "Aqueous Processing of Arsenic Trioxide to Crystalline Scorodite," *JOM*, Jun. 1994, pp. 36-38, vol. 46, No. 6. Published by Springer New York LLC, USA.
Droppert et al., "Ambient Pressure Production of Crystalline Scorodite From Arsenic-Rich Metallurgical Effluent Solutions," *EPD Congress*, Feb. 4, 1996, pp. 227-239, published by The Minerals, Metals &Materials Society, Warrendale, Pa, USA.
Extended European Search Report issued in European Application No. 08791096.4 on Jul. 22, 2010.
Extended European Search Report issued in European Application No. 08791100.4 on Aug. 27, 2010.
Extended European Search Report issued in European Application No. 08791098.0 on Jul. 27, 2010.
Extended European Search Report issued in European Application No. 08791092.3 on Jun. 28, 2010.
Supplementary European Search Report issued in Application No. 08 79 1091; Dated Oct. 12, 2010.
May 27, 2011 Office Action issued in U.S. Appl. No. 12/452,509.
May 31, 2011 Office Action issued in U.S. Appl. No. 12/452,593.
May 31, 2011 Office Action issued in U.S. Appl. No. 12/452,686.
Mar. 7, 2011 Office Action issued in U.S. Appl. No. 12/452,534.
Sept. 9, 2011 Notice of Allowance issued in U.S. Appl. No. 12/452,534.
Sep. 20, 2011 Notice of Allowance issued in U.S. Appl. No. 12/452,593.
Sep. 21, 2011 Notice of Allowance issued in U.S. Appl. No. 12/452,686.

* cited by examiner

METHOD OF ALKALI PROCESSING SUBSTANCE CONTAINING ARSENIC

TECHNICAL FIELD

The present invention relates to a method of processing a substance that contains diarsenic trioxide ($As_2O_3$) and heavy metal; of extracting arsenic from a substance that contains diarsenic trioxide and heavy metal, and crystallizing it into a scorodite crystal which is a stable arsenic compound.

BACKGROUND ART

There are Documents on stabilization of a compound that contains arsenic.

Patent Document 1 describes a method of producing scorodite directed to arsenic that is contained in smelter soot.

Patent Document 2 relates to a method of leaching arsenic sulfide. It describes adding alkali while blowing air to slurry that contains arsenic sulfide, and leaching arsenic while maintaining the pH to 5 to 8.

Non-Patent Document 1 reports solubility products of iron arsenate, calcium arsenate and magnesium arsenate. According to the document, while calcium arsenate and magnesium arsenate are stable only in an alkali region, iron arsenate is stable in a neutral to acidic region. The document reports the minimum solubility 20 mg/l at pH 3.2.

Non-Patent Document 2 discloses solubility of iron arsenate and scorodite. The literature indicates that solubility of arsenic from scorodite in a weak acidic region is lower than solubility of arsenic from amorphous iron arsenate by two digits, which discloses that scorodite is a stable arsenic compound.

Non-Patent Document 3 describes a method of producing scorodite directed to arsenic that is contained in wastewater from sulfuric acid plants or smelters.

[Patent document 1] Japanese Patent Application Laid Open No. 2005-161123

[Patent document 2] Japanese Patent Publication No. 61-24329

[Non-patent document 1] Tadahisa Nishimura, Kazumitsu Tozawa, "Report of Research Institute of Mineral Dressing and Metallurgy, Tohoku University" No. 764, Vol. 34, Separate Print No. 1, 1978, June

[Non-patent document 2] E. Krause and V. A. Ettel, "Solubilities and Stabilities of Ferric Arsenate Compounds" Hydrometallurgy, 22, 311-337, (1989)

[Non-patent document 3] Dimitrios Filippou and George P. Demopoulos, "Arsenic Immobilization by Cotrolled Scorodite Precipitation" JOM Dec., 52-55, (1997)

DISCLOSURE OF THE INVENTION

Problem to be Solved by the Invention

Recently, global environment on non-ferrous smelting for securing mineral raw materials is very harsh. Particularly, the demand is very tight in the filed of cupper smelting where oligopoly by major non-iron companies is advancing and new large consumer countries such as developing country have emerged.

Under such circumstances, the individual countries are tightening and mandating more and more regulations in the environmental field. The present inventors have thought that the industry will be lead by mines and smelters that can co-exist with the environment.

Here, examples of pollutions concerned in non-ferrous smelting are air pollution caused by $SO_2$ gas, and soil and wastewater pollutions caused by arsenic. Particularly, since the content of arsenic in copper ore is expected to increase in the future, implementation of full-scale measures will be further required than ever.

Conventionally, coastal non-ferrous smelters in Japan have been conducting their operations without problems by using clean concentrates as treated materials. However, since the content of arsenic in copper ore is expected to increase, the inventors thought that an art will be necessary of taking arsenic as smelting intermediates to the outside of the system, stabilizing it in a certain form, and controlling and storing it.

Accordingly, the present inventors investigated the aforementioned Documents.

However, no Patent Documents or Non-Patent Documents describe a method of processing diarsenic trioxide, which extracts arsenic from diarsenic trioxide or a non-ferrous smelting intermediate containing diarsenic trioxide, and converts it into a stable arsenic compound.

The present invention has been made under such circumstance. An object of the present invention is to provide a method of processing a substance that contains diarsenic trioxide and heavy metal; which extracts arsenic from a substance that contains diarsenic trioxide and heavy metal, and processes it to a scorodite crystal with good filterbility and stability.

[Means for Solving Problems]

The present inventors were dedicated to the research to resolve the aforementioned problem. As a result, they obtained a totally new discovery. They discovered that arsenic can be recovered as scorodite with good filterbility and stability by implementing a leaching step of adding water and alkali to a substance that contains diarsenic trioxide to produce slurry to obtain leachate in which arsenic is leached; implementing a solution adjusting step of adding an oxidizing agent to oxidize trivalent arsenic to pentavalent arsenic in the leachate, and further after the oxidation, removing the oxidizing agent remaining in the leachate so as to obtain an adjusted solution; and implementing crystallizing step of converting arsenic in the adjusted solution to scorodite crystal. Note that heavy metal according to the present invention refers to the heavy metal excluding arsenic.

In addition, the present inventors discovered that an oxidation reaction of oxidizing trivalent arsenic to pentavalent arsenic in a short period of time can be performed by blowing an oxidized gas into an aqueous solution containing the trivalent arsenic while heating the aqueous solution containing the trivalent arsenic in the presence of the three types of substances that are copper sulfide, copper ions, and copper pentavalent arsenic compounds as catalysts. Moreover, the present inventors confirmed that 99% or more of the trivalent arsenic is oxidized to a pentavalent form at the stop of this oxidation reaction, and have thus achieved the present invention.

The first means to resolve the aforementioned problem is a method of processing a substance that contains diarsenic trioxide and heavy metal, including:

a leaching step of adding water and alkali to a non-ferrous smelting intermediate that contains diarsenic trioxide and heavy metal to produce slurry, heating the slurry, and leaching arsenic so as to obtain leachate;

a solution adjusting step of adding an oxidizing agent to the leachate to oxidize trivalent arsenic to pentavalent arsenic so as to obtain an adjusted solution; and a crystallizing step of converting arsenic in the adjusted solution to scorodite crystal.

The second means is the method of processing a substance that contains diarsenic trioxide and heavy metal according to first means 1, wherein the leaching step uses NaOH as alkali and is performed in an alkali region where the pH is not less than 8.

The third means is the method of processing a substance that contains diarsenic trioxide and heavy metal according to the first or second means, wherein the solution adjusting step uses hydrogen peroxide as the oxidizing agent, and further removing the hydrogen peroxide remaining in the adjusted solution by bringing it contact with metallic cupper.

The fourth means is the method of processing a substance that contains diarsenic trioxide and heavy metal according to any of the first to third means, wherein the crystallizing step converts arsenic in the adjusted solution to scorodite crystal by adding and dissolving ferrous ($Fe^{2+}$) salt in the adjusted solution to oxidize the ferrous salt.

The fifth means is the method of processing a substance that contains diarsenic trioxide and heavy metal according to the fourth means, wherein one of air and oxygen gas or mixed gas thereof is blown to the adjusted solution to oxidize the ferrous salt.

The sixth means is the method of processing a substance that contains diarsenic trioxide and heavy metal according to any of the first to fifth means, wherein the crystallizing step is performed in a region where the pH is no more than 1.

The seventh means is the method of processing a substance that contains diarsenic trioxide and heavy metal according to any of the first to sixth means, wherein the crystallizing step is performed at 50° C. or higher.

The eighth means is an arsenic oxidation method, wherein by blowing at least one of air and/or oxygen gas is blown into a solution to oxidize trivalent arsenic in the solution to pentavalent arsenic, the solution containing at least one of diarsenic trioxide ($As_2O_3$) and/or arsenous acid ions, being heated to 50° C. or higher, having a pH of not less than 1 in a neutral region, and comprising copper sulfide, copper ions, and a copper pentavalent arsenic compound, trivalent arsenic in the solution is oxidized to pentavalent arsenic.

The ninth means is an arsenic oxidation method, wherein by blowing at least one of air and/or oxygen gas into a solution that contains at least one of diarsenic trioxide ($As_2O_3$) and/or arsenous acid ions, is heated to 50° C. or higher, has a pH of not less than 2 in a neutral region, and comprises copper sulfide, trivalent arsenic in the solution is oxidized to pentavalent arsenic, while generating the copper pentavalent arsenic compound by dissolving a portion of the copper sulfide.

The tenth means is the arsenic oxidation method according to the eighth or ninth means, wherein the pH is not less than 2 when the blowing of at least one of air and/or oxygen gas starts, and less than 2 when the blowing of at least one of air and/or oxygen gas ends.

The eleventh means is the arsenic oxidation method according to any of the eighth to tenth means, wherein after the trivalent arsenic in the solution is oxidized to the pentavalent arsenic, the solution produced by pulp is filtered and a filtering residue is recovered, and the filtering residue is used as a substitute for the copper sulfide.

The twelfth means is the arsenic oxidation method according to any of the eighth to eleventh means, wherein after the trivalent arsenic in the solution is oxidized to the pentavalent arsenic, the solution produced by pulp is neutralized to bring the pH to not less than 3 and thereby crystallize the copper ions in the solution as the copper pentavalent arsenic compound, and then filtering is performed to recover a filtrate and a filtering residue, and the filtering residue is used as a substitute for the copper sulfide.

EFFECT OF THE INVENTION

According to the present invention, arsenic can be extracted from a substance that contains diarsenic trioxide and heavy metal, and processed to scorodite crystal with good filterbility and stability.

In addition, according to any of the eighth to twelfth means, trivalent arsenic can be oxidized to pentavalent arsenic at an oxidation rate of 99% or more with low operation costs and low equipment costs, by using materials that are easily obtainable in non-ferrous smelters. Furthermore, according to the present invention, the pH of the solution at the stop of the oxidation reaction is not less than 1 and below 2, which is favorable for producing scorodite ($FeAsO_4.2H_2O$). In this respect, too, the present invention contributes to low operation costs and low equipment costs.

BEST MODE FOR CARRYING OUT THE INVENTION

As described above, the present invention relates to a method of processing a substance that contains diarsenic trioxide and heavy metal, including: implementing a leaching step of adding water and alkali to obtain leachate in which arsenic is leached; next, implementing a solution adjusting step of adding an oxidizing agent to oxidize trivalent arsenic in the leachate to pentavalent arsenic, and after the oxidation, removing the oxidant remaining in the leachate so as to obtain an adjusted solution; and further a crystallizing step of converting arsenic in the adjusted solution to scorodite crystal.

In addition, the present invention also relates to a method of oxidizing trivalent arsenic to pentavalent arsenic at an oxidation rate of 99% or more with low operation costs and low equipment costs.

Hereinafter, 1. Nonferrous smelting intermediate containing diarsenic trioxide; 2. Leaching step; 3. Solution adjusting step; 4. Crystallizing step converting arsenic in the adjusted solution to scorodite crystal; and Example 1 will be described in order in detail while referring to a flowchart shown in FIG. 1.

Next, as the second embodiment, a method of oxidizing trivalent arsenic to pentavalent arsenic at an oxidation rate of 99% or more with low operation costs and low equipment costs will be described. The 1. Processing object; 2. Oxidation reaction of trivalent arsenic; 3. pH of the trivalent arsenic at the beginning of the oxidation reaction; 4. pH of the trivalent arsenic at the stop of the oxidation reaction; and Examples 2 to 6 and Comparative Examples 1 to 5 will be described in order in detail while referring to the flowchart shown in FIG. 2, and further the 5. Trivalent arsenic oxidation reaction model conceived by the present inventors will be described.

1. Substance that Contains Diarsenic Trioxide and Heavy Metal

Specific examples of substances that contain diarsenic trioxide and heavy metal according to the present invention include non-ferrous smelting intermediate containing diarsenic trioxide. Accordingly, a non-ferrous smelting intermediate containing diarsenic trioxide will be hereinafter described as a substance that contains diarsenic trioxide and heavy metal.

An non-ferrous smelting intermediate containing diarsenic trioxide (1) is produced as an intermediate product in a non-ferrous smelter industry and other industries. Note that, this processing method is not limited to smelters that discharge arsenic to the outside of the system as a non-ferrous smelting intermediate containing diarsenic trioxide in an existing smelting step. It is also effective for smelters in which arsenic is stored as diarsenic trioxide.

Examples of the non-ferrous smelting intermediates that contain diarsenic trioxide and heavy metal as arsenic include roasted soot containing heavy metals. In the case where an intermediate contains arsenic and heavy metal, heavy metal and arsenic generate a compound in many cases. Therefore, in the case where arsenic is leached under the leaching condition disclosed in the present invention, the original form of arsenic to be extracted is not necessarily limited to diarsenic trioxide. Note that heavy metal according to the present invention refers to the heavy metal excluding arsenic.

2. Leaching Step

The non-ferrous smelting intermediate that contains diarsenic trioxide (1) contains heavy metal such as lead, cadmium or the like other than arsenic. As a result, the form of arsenic in the intermediate is complicated. The present inventors made researches to efficiently leach arsenic having the complicated form. As a result, the present inventors have reached a mechanism of adding water and alkali to a non-ferrous smelting intermediate containing diarsenic trioxide, and further heating it to leach arsenic. Specifically, leaching is performed after adding water in the necessary amount and alkali such as NaOH, KOH to the non-ferrous smelting intermediate containing diarsenic trioxide (1) to bring the state to an alkali region where the pH is not less than 8. On the other hand, since heavy metal other than arsenic also dissolves when the pH exceeds 12, it is preferable that the pH is kept to be no more than 12.

Having such mechanism in the leaching step (2) according to the present invention enables inhibiting elution of heavy metals from a non-ferrous smelting intermediate containing diarsenic trioxide, while promoting leaching of arsenic, and whereby arsenic can be efficiently leached from a non-ferrous smelting intermediate.

A residue (7) that is generated may be put into a copper smelting (8) step.

Next, the reaction condition in the leaching step (2) will be described.

<Dissolving Method and Time>

A highly-concentrated arsenic solution is needed to efficiently manufacture scorodite (6) in a crystallizing step (5) which is the next step.

Accordingly, it is conceivable that trivalent arsenic in diarsenic trioxide is oxidized to pentavalent arsenic so as to increase solubility in the leaching reaction, and thereby increasing the leach rate. However, this causes a problem in which pentavalent arsenic reacts with heavy metal to produce arsenate; and thereby arsenic is precipitated.

The present inventors herein have arrived a breakthrough mechanism of adding alkali while leaching trivalent arsenic form from diarsenic trioxide, thereby to increase solubility of trivalent arsenic.

Specifically, a non-ferrous smelting intermediate containing a certain amount of diarsenic trioxide, water and alkali are blended to produce a pulp in an alkali region where the pH is not less than 8, and the pulp is leached at 50° C. or higher. For alkali, caustic soda is preferable. This is because sodium reacts with trivalent arsenic, and whereby arsenic is leached.

Details of the mechanism of increasing solubility of trivalent arsenic by adding alkali while leaching trivalent arsenic form from diarsenic trioxide are not known. However, the present inventors think that the reactions according to the following Equations 1 and 2 proceed simultaneously.

$$As_2O_3 + H_2O = 2HAsO_2 \quad \text{(Equation 1)}$$

$$As_2O_3 + NaOH = 2NaAsO_2 + H_2O \quad \text{(Equation 2)}$$

This is based on the discovery that solubility of trivalent arsenic increases even if the additive amount of alkali is smaller than the amount calculated from Equation 2.

If alkali is excessively added in the step, viscosity of the solution increases in the crystallizing step which is the next step, whereby working property drops. With this problem taken into consideration, the discovery that the additive amount of alkali may be reduced by the fact that (Equation 1) and (Equation 2) simultaneously proceed is very much preferable.

In addition, another merit of the mechanism is that no precipitation of diarsenic trioxide crystal is observed even if the solution temperature of leachate (3) is decreased to approximately the room temperature.

3. Solution Adjusting Step

This solution adjusting step (4) is a step of oxidizing trivalent arsenic in the leachate (3) to pentavalent arsenic, and subsequently, removing the oxidizing agent that remains.

Most of arsenic in the leachate (3) has dissolved as trivalent arsenic. Air or oxygen gas is difficult to act as the oxidizing agent for substantially completely oxidizing the trivalent arsenic to pentavalent arsenic. Accordingly, the inventors have reached the idea of employing hydrogen peroxide ($H_2O_2$). Note that, commonly used hydrogen peroxide of concentration of 30 to 35% may be used.

Hydrogen peroxide may be added to the leachate directly. Oxidation of trivalent arsenic by adding hydrogen peroxide is shown in (Equation 3) to (Equation 6).

$$AsO_2^- + H_2O_2 = HAsO_4^{2-} + H^+ \quad \text{(Equation 3)}$$

$$HAsO_2 + H_2O_2 = HAsO_4^{2-} + 2H^+ \quad \text{(Equation 4)}$$

$$HAsO_2 + H_2O_2 = H_2AsO_4^- + H^+ \quad \text{(Equation 5)}$$

$$HAsO_2 + H_2O_2 = H_3AsO_4 \quad \text{(Equation 6)}$$

In other words, hydrogen ions are generated with the advancement of the oxidation reaction, and the pH of the leachate drops and changes from an alkali region to a neutral region and further to an acid region.

The solution in the crystallizing step described later is an acidic solution of pH=1. With this fact taken into consideration, this step is preferable in that the pH is decreased merely by advancement of the reactions without use of sulfuric acid, and thus the pH can be reached the vicinity of an acid region of the solution at the time of crystallization.

Preferable addition time of hydrogen peroxide is 10 to 15 minutes. Provided that the addition time is not less than 5 minutes or more, it is possible to avoid generation of air bubble caused by partial degradation at the time when hydrogen peroxide is added.

The additive amount of hydrogen peroxide may be the theoretical amount (i.e., 1 time equivalent) necessary for oxidation reaction of trivalent arsenic. If the concentration of trivalent arsenic is not known, (Equation 7) may be used as a rough guide. In this case, (Equation 7) should be satisfied when it is assumed that the Redox on potential at 80° C. after hydrogen peroxide is added is set as AmV, and the reading by the pH meter when hydrogen peroxide is added is completed is (pH).

$$AmV = -60 \times (pH) + 590 \quad \text{(Equation 7)}$$

(at 80° C.) (AmV is Vs; Ag/AgCl), where, $1.0 < pH < 3.0$

Since oxidation of trivalent arsenic by hydrogen peroxide is so quick that decrease in the pH and increase in temperature caused by reaction heat are observed while hydrogen peroxide. However, it requires not less than 60 minutes to perform oxidation completely.

The reaction temperature is preferably 40° C. or higher. In addition, a higher reaction temperature is more preferable from the perspective of promoting the oxidation reaction from trivalent arsenic to pentavalent arsenic.

Note that, as described above, oxidation reaction from trivalent arsenic to pentavalent arsenic caused by addition of hydrogen peroxide is an exothermal reaction. Accordingly, for example, in the case where the oxidation reaction of a solution of arsenic concentration approximately 50 g/l is caused to occur at 80° C., although affected by the heat dissipation situation from the apparatus when addition of hydrogen peroxide is started at the solution temperature approximately 60° C., the solution temperature at the completion of adding a certain amount thereof will be approximately 80° C.

Next, the step of removing the oxidizing agent that remains in the solution after the oxidation reaction will be described.

The oxidizing agent that remains after the reaction oxidizes a part of ferrous ($Fe^{2+}$) which is added in the crystallizing step (5) which is the next step. Accordingly, this step is performed because it is preferable to remove the oxidizing agent to accurately control the ferrous ion concentration.

A method of adding metallic colloid such as gold, silver, or the like and dissolving it is also conceivable in order to remove hydrogen peroxide that remains in the leachate (3). However, taking into consideration its handling property or generation of loss, the method is not appropriate in the actual operation.

Accordingly, the present inventors have achieved the mechanism of removing the oxidizing agent (for example, hydrogen peroxide) that remains by consuming the oxidizing agent rather than by degrading it. Specifically, the oxidizing agent is brought into contact with the oxidized agent (for example, metallic copper) and removed by being consumed as shown in (Equation 8).

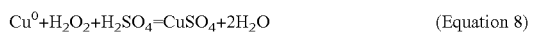

$Cu^0 + H_2O_2 + H_2SO_4 = CuSO_4 + 2H_2O$ (Equation 8)

The reaction temperature is preferably 40° C. or higher to complete the reaction. In addition, since the reaction accompanies increase in the pH, the reaction can be judged as completed at the time when the pH shows a constant value.

4. Crystallizing Step

The crystallizing step (5) is a step of crystallizing pentavalent arsenic in the adjusted solution which is obtained in the solution adjusting step (4) into scorodite (6).

With productivity of scorodite (6) being taken into consideration, the adjusted solution obtained after the solution adjusting step (4) is preferably a highly-concentrated solution of arsenic concentration 20 g/l or higher, and more preferably of 30 g/l or higher.

First, ferrous ($Fe^{2+}$) salt is added and dissolved into the adjusted solution, and sulfuric acid ($H_2SO_4$) is added at the room temperature so as to adjust the pH to pH=1. Among a variety of ferrous salt compounds, ferrous sulfate is preferable from the perspective of corrosion resistance of the equipment and easiness of availability.

The additive amount of ferrous salt is 1 time equivalent or more of the number of moles of arsenic to be processed as iron purity, and preferably 1.5 times equivalent or more.

When ferrous salt is added and the pH is adjusted, the temperature of the adjusted solution is increased to a predetermined reaction temperature. In this case, as long as the reaction temperature is 50° C. or higher, it is possible to precipitate scorodite (6). However, a higher reaction temperature is more preferable from the perspective of increasing the grain size of scorodite. Note that, the reaction temperature is preferably set to 90 to 100° C. from the perspective of making the reaction under ambient atmosphere possible.

When the temperature of the adjusted solution has reached the predetermined reaction temperature, blowing of one of air and oxygen gas, or a mixture gas thereof is started, and the solution is stirred strongly to create the gas-liquid mixing state. While the predetermined reaction temperature is maintained, an oxidation reaction at a high temperature is caused to proceed.

The oxidation reaction at a high temperature is thought to proceed as shown in (Equation 9) to (Equation 14) in approximately 2 to 3 hours.

<The First Half of the Reaction>

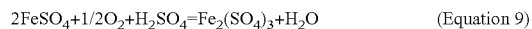

$2FeSO_4 + 1/2O_2 + H_2SO_4 = Fe_2(SO_4)_3 + H_2O$ (Equation 9)

$2H_3AsO_4 + Fe_2(SO_4)_3 + 4H_2O = 2FeAsO_4 \cdot 2H_2 + 3H_2SO_4$ (Equation 10)

<Whole Reaction Equation ((Equation 9)+(Equation 10)) is Shown in (Equation 11) as Follows.>

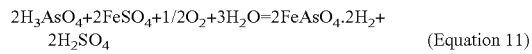

$2H_3AsO_4 + 2FeSO_4 + 1/2O_2 + 3H_2O = 2FeAsO_4 \cdot 2H_2 + 2H_2SO_4$ (Equation 11)

<Latter Half of the Reaction where as Concentration has Dropped>

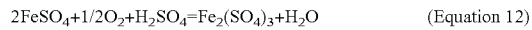

$2FeSO_4 + 1/2O_2 + H_2SO_4 = Fe_2(SO_4)_3 + H_2O$ (Equation 12)

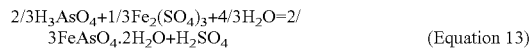

$2/3 H_3AsO_4 + 1/3 Fe_2(SO_4)_3 + 4/3 H_2O = 2/3 FeAsO_4 \cdot 2H_2O + H_2SO_4$ (Equation 13)

<Whole Reaction Equation ((Equation 12)+(Equation 13)) is Shown in (Equation 14) as Follows.>

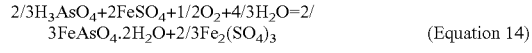

$2/3 H_3AsO_4 + 2FeSO_4 + 1/2O_2 + 4/3 H_2O = 2/3 FeAsO_4 \cdot 2H_2O + 2/3 Fe_2(SO_4)_3$ (Equation 14)

Although affected by the oxidation method, the pH, the arsenic concentration and the Fe concentrate¥ion sharply dropped within 2 to 3 hours after the oxidation reaction at a high temperature started. At this stage, the indicated redox potential of the solution is 400 mV or higher (Vs; Ag/AgCl) at 95° C. In addition, 90% or more of the arsenic contained is a crystal of scorodite (6). Three 3 hours after starting the oxidation reaction at a high temperature or thereafter, arsenic that remains in the solution decreases by only a small amount, while the pH or the redox potential rarely changes. Note that, the oxidation reaction at a high temperature is preferably continued for 5 to 7 hours to end the oxidation reaction at a high temperature in the complete equilibrium condition.

The aforementioned crystallizing step (5) according to the present invention allows easy reaction operation and can convert the contained arsenic into scorodite (6) crystal without the need of adjusting pH in the middle of the reaction.

A filtrate (9) that is generated may be treated by a wastewater treatment step (10).

The obtained scorodite (6) crystal is excellent in sedimentability and filterability, and achieves volume reduction with adhesive moisture approximately 10% after filtering and high arsenic grade as much as 30%. In addition, the crystal is excellent in elution resistance and stability. Therefore, it is possible to remove arsenic in astable form from the smelting step and store it.

EXAMPLES

Examples will now been shown to describe the present invention more specifically.

Example 1

<Leaching>

Diarsenic trioxide ($As_2O_3$) of chemical reagent with as content grade 74.4%, and PbO (98%), ZnO (99%), CdO (95%) of reagent grade 1 were blended in accordance with the blending table shown in Table 1. The mixture was introduced in a 2 L beaker (with 4 baffle plates). Further, 1,500 cc of pure water was added to the 2 L beaker and the mixture was stirred to produce a pulp. Subsequently, 21 g of solid NaOH was added and dissolved in the pulp, and the temperature is increased to 70° C. to start leaching.

Although diarsenic trioxide can be leached within a short period of time, the reactions of the existing Pb, Cd, Zn should also be equilibrated in this case. With this taken into consideration, the leaching time was set to 180 minutes.

Note that, the pH of the pulp at the stop of the reaction was 8.78 (at 69.5° C.)

The grade and the pH of the obtained leachate are shown in Table 2.

TABLE 1

| Reagent | $As_2O_3$ | ZnO | PbO | CdO |
|---|---|---|---|---|
| Blending quantity (g) | 101 | 13 | 10 | 3 |

TABLE 2

| As (g/l) | Na (g/l) | Pb (mg/l) | Zn (mg/l) | Cd (mg/l) | pH (at 28° C.) |
|---|---|---|---|---|---|
| 49.7 | 8 | 45 | 939 | 2 | 9.16 |

<Solution Adjustment>

840 cc of the obtained leachate was measured and introduced to a 1 L beaker, and heating on the leachate was started.

Assuming that all arsenic contained in the leachate was trivalent arsenic, 63 g of hydrogen peroxide corresponding to 30% of the equivalent required for oxidizing the trivalent arsenic was measured.

When the temperature of the leachate reached 62° C., addition of the measured hydrogen peroxide started, and addition of the all amount thereof was completed in 15 minutes. The leachate was stirred to the extent that air bubbles were not induced.

The transitions of the temperature (° C.), the pH and the redox potential (mV,Vs: Ag/AgCl) during the reaction are shown in Table 3.

Hydrogen peroxide remaining in the adjusted solution was to be removed with use of metallic cupper. In this example, powdery metallic copper of reagent grade 1 was used.

Specifically, 1.8 g of powdery cupper was added when the solution temperature reached 40° C. Transitions of the temperature (° C.), the pH and the redox potential (mV,Vs: Ag/AgCl) in accordance with the reaction time elapsed are shown in Table 4. The reaction was completed in 4 minutes, and the adjusted solution was obtained.

Note that, the arsenic concentration of the adjusted solution was 47.5 g/l, and the cupper concentration thereof was 49 mg/l.

TABLE 4

| | Start of the reaction | Addition of Cu powder | While the reaction is maintained | | At the stop of reaction |
|---|---|---|---|---|---|
| Elapsed time (minutes) | Immediately before the start | 1 | 2 | 3 | 4 |
| Solution temperature (° C.) | 40.3 | 40.6 | 40.6 | 40.7 | 40.9 |
| pH | 2.25 | 2.26 | 2.26 | 2.27 | 2.27 |
| Redox potential (mV) | 309 | 200 | 193 | 176 | 82 |

<Crystallization>

1) The obtained adjusted solution was diluted with pure water, and the arsenic concentration was adjusted to 45 g/l.

2) The aforementioned 800 cc was transferred to a 2 L beaker, and its pH was adjusted to 1.15 with use of 95% sulfuric acid.

3) The additive amount of ferrous ($Fe^{2+}$) was set to 1.5 Times equivalent to the number of moles of As. 200 g each of ferrous sulfate ($FeSO_4.7H_2O$) of reagent grade 1 was measured, and dissolved into the adjusted solution of above 2). Next, the pH was adjusted to pH=1.0 at 30° C. with the use of 95% sulfuric acid.

4) The solution in above 3) as above was heated at the atmospheric pressure to 95° C., and subsequently, gas blowing was started in oxygen gas at 950 cc/minute using a glass tube from the bottom of the beaker. The oxidation reaction at a high temperature was caused to occur under strong stirring and in the gas-liquid mixing state for 7 hours. The result shall be shown in Table 5 as follows.

TABLE 3

| | Immediately before addition | At the stop of addition | While the reaction is maintained | | | At the stop of reaction |
|---|---|---|---|---|---|---|
| Elapsed time (minutes) | 0 | 15 | 30 | 45 | 75 | 90 |
| Solution temperature (° C.) | 62 | 80 | 79.6 | 79.8 | 80.1 | 79.5 |
| pH | 8.74 | 2.58 | 2.53 | 2.52 | 2.51 | 2.51 |
| Redox potential (mV) | −137 | 433 | 433 | 434 | 312 | 293 |

TABLE 5

| As sedimentation rate (%) | Moisture content (%) | Scorodite | | | | | | |
|---|---|---|---|---|---|---|---|---|
| | | Composition (%) | | Elution value (mg/l) | | | | |
| | | As | Fe | As | Pb | Cd | Hg | Se |
| 97.6 | 8.8 | 31.4 | 25.3 | <0.01 | <0.01 | <0.01 | <0.005 | <0.1 |

As sedimentation rate: Conversion rate of as in the solution to scorodite

Elution value: In compliance with Notification of No. 13 of Japanese Environment Agency Second Embodiment According to the research of the present inventors, the above oxidation method using hydrogen peroxide ($H_2O_2$) achieves approximately 100% oxidation of trivalent arsenic by accelerating the trivalent arsenic oxidation speed and causing the reaction at a high solution temperature. However, hydrogen peroxide is an expensive agent.

On the other hand, the oxidation method using ozone ($O_3$) achieves approximately 100% oxidation of trivalent arsenic in a short period of time, irrespective of solution temperature. However, this oxidation method has the following problems.

Ozone generating equipment itself requires high costs. Furthermore, ozone has strong oxidizing power, so that the specification of peripheral apparatuses needs to be upgraded. This results in extremely high costs for the system as a whole.

Because ozone is hazardous to humans, an ancillary facility for collecting and detoxifying ozone that is released to the atmosphere without reaction is necessary.

Ozone is easy to dissolve in water than oxygen gas, and the solution after reaction has a peculiar pungent odor. To resolve this problem, a step of removing dissolved ozone in a subsequent step is necessary.

Meanwhile, it became clear that the method of adding powdery metallic copper or the like as a catalyst has the following problems.

1) In the case where the solution to be treated has a low arsenic concentration (for example, approximately 3 g/L), the oxidation rate of arsenic is approximately 100%. However, in the case where the solution to be treated has a high arsenic concentration (for example, 60 to 70 g/L), the oxidation rate of arsenic drops to approximately 79%.

2) When metallic copper ($C^0$) changes to copper ions ($Cu^{2+}$), the change of trivalent arsenic to pentavalent arsenic is affected. In addition, at the time of this change, at least the number of moles of metallic copper equivalent to trivalent arsenic is required. Furthermore, the same effects as metallic copper are confirmed even in a poor water soluble copper compound ($Cu_2O$, $CuS$). As a result, a large amount of agent (copper source) is necessary when processing arsenous acid being a trivalent arsenic compound.

3) As explained in the above 2), this method uses a large amount of copper source when processing arsenous acid (trivalent arsenic). As a result, copper ions as many as several tens of g/L remains in the solution after the reaction. Therefore, a step of recovering copper from the solution after the reaction is necessary, which causes an increase in copper recovery costs.

4) This reaction is conducted in the acidic solution (for example, the pH is 0 and the FA (free acid) value is 130 g/L), so that a large amount of acid content remains in the solution after the reaction. In order to produce a pentavalent arsenic compound based on the solution after the reaction, a large amount of alkali is necessary. This is an inevitable problem as this method requires dissolving powdery metallic copper and/or a poor water-soluble copper compound, that is, acid content is essential for this method.

Hereinafter, the second embodiment for carrying out the present invention will be described. The 1. Processing object; 2. Oxidation reaction of trivalent arsenic; 3. pH of the trivalent arsenic at the beginning of the oxidation reaction of, 4. pH of trivalent arsenic at the stop of the oxidation reaction; Examples 2 to 6, Comparative Examples 1 to 5 will be described in order in detail while referring to the flowchart shown in FIG. 2, and further the 5. Trivalent arsenic oxidation reaction mechanism model conceived by the present inventors will be described.

According to this embodiment, trivalent arsenic can be oxidized to pentavalent arsenic at an oxidation rate of 99% or more with low operation costs and low equipment costs, by using materials that are easily obtainable in non-ferrous smelters.

1. Processing Object

This embodiment is an optimum processing method for producing a highly concentrated arsenic solution.

In other words, according to this embodiment, trivalent arsenic of low solubility can be easily oxidized to pentavalent arsenic of high solubility. Therefore, by using diarsenic trioxide <1> which is solid as the trivalent arsenic source, the diarsenic trioxide dissolves simultaneously with the oxidation of trivalent arsenic to pentavalent arsenic, which ensures the timely supply of trivalent arsenic. As a result, a pentavalent arsenic solution of a concentration as high as several tens of g/L, that is, a concentrated arsenic acid solution can be easily produced.

2. Oxidation Reaction of Trivalent Arsenic

In order to derive this embodiment relating to the oxidation step <4>, the present inventors investigated the step of oxidizing trivalent arsenic by oxygen gas, using copper as an oxidation catalyst for arsenic.

Several points that are subject to the investigation are given below.

1) Using only copper ions as an oxidation catalyst (corresponding to Comparative Examples 1 and 2 described later).

2) Using only copper sulfide as an oxidation catalyst (corresponding to Comparative Example 3 described later).

3) Using the two types of oxidation catalysts of copper sulfide and copper ions together (corresponding to Comparative Example 4 described later).

4) Using the three types of oxidation catalysts of copper sulfide, copper ions, and a copper pentavalent arsenic compound together (corresponding to Examples 2 to 6 described later).

As a result of the above investigation, the oxidation catalyst effects of copper were observed in all of 1) to 4). However, 4) was found to have dramatic improvements in the oxidation catalyst effects of copper when compared with 1) to 3), in terms of oxidation speed and oxidation rate.

Based on this discovery, it was determined that copper sulfide, copper ions, and a copper pentavalent arsenic compound (copper arsenate) are used together as oxidation catalysts.

Hereinafter, (a) copper sulfide source, (b) copper ion source, (c) copper pentavalent arsenic compound (copper arsenate), (d) reaction temperature, and (e) blowing gas type and blowing amount will be described in detail.

(a) Copper Sulfide Source

Copper sulfide solid, copper sulfide powder, and the like can be used as the copper sulfide source <2>. Furthermore, the powdery state is preferable from the perspective of ensuring reactivity. In addition, copper sulfide can be mainly classified into the two compositions of CuS and $Cu_2S$ (there is also $Cu_9S_5$ being a composition in which a portion of copper in crystal lattice is defective). In this embodiment, any of them is effective, and a mixture of them is also possible. Moreover, the copper sulfide source is preferably as pure copper sulfide as possible (copper sulfide of high purity with minimum impurities). This is because contamination with $As_2S_3$, ZnS, PbS, CdS, and the like can be avoided by using copper sulfide of high purity.

If contaminated with $As_2S_3$, ZnS, PbS, CdS, and the like (equation 15 to 18) occurs, the following reactions occur. As a result, the supply of copper ions necessary for the oxidation reaction of trivalent arsenic is hindered.

Furthermore, regarding $As_2S_3$, that is, arsenic sulfide, even when copper ions are added consciously, the following reaction occurs, which not only makes the maintenance of an optimum copper ion concentration difficult, but also causes hydrogen ion ($H^+$) evolution reaction. When hydrogen ions ($H^+$) are generated, the pH of the reaction system drops. This makes it difficult to maintain the oxidation reaction of trivalent arsenic according to the present invention, and makes it difficult to oxidize trivalent arsenic.

$$Cu^{2+}+1/3As_2S_3+4/3H_2O=CuS+2/3HAsO_2+2H^+ \quad \text{(Equation 15)}$$

$$Cu^{2+}+ZnS=CuS+Zn^{2+} \quad \text{(Equation 16)}$$

$$Cu^{2+}+PbS=CuS+Pb^{2+} \quad \text{(Equation 17)}$$

$$Cu^{2+}+CdS=CuS+Cd^{2+} \quad \text{(Equation 18)}$$

Consider the case where copper sulfide recovered as smelting intermediates is used as the copper sulfide source <2>. The recovered copper sulfide contains substantial amounts of the aforementioned $As_2S_3$, ZnS, PbS, CdS, and the like. Therefore, it is not preferable to use the copper sulfide recovered as smelting intermediates directly as the copper sulfide source <2>. However, the recovered copper sulfide can be used if the aforementioned sulfides are removed beforehand by decomposition reaction or the like to thereby increase the purity as copper sulfide.

In copper smelters, copper sulfide of high purity suitable for the present invention can be easily produced according to the following method.

(1) Electrolytic copper is dissolved (Cu=10 to 30 g/L) by aeration while heating under sulfite acidic conditions (FA (free acid)=50 to 300 g/L), to obtain a copper solution.

(2) The obtained copper solution is reacted with a sulfidizing agent such as NaSH or $H_2S$ at a temperature of 50° C. or more, to recover copper sulfide.

(3) The recovered copper sulfide is washed with water to remove adhered acid content.

The copper sulfide after the water cleaning has little impurities, and is suitable for the present invention in any of the dry condition and the wet condition.

(b) Copper Ion Source

A substance that becomes copper ions in the solution to be treated can be used as the copper ion source <3>. For example, copper sulfide is preferable, as it is solid at ordinary temperatures, but dissolves into water and immediately becomes copper ions. Though metallic copper or metallic copper powder can also be used, it is necessary to wait for the dissolution until they are ionized.

(c) Copper Pentavalent Arsenic Compound (Copper Arsenate)

Copper arsenate is available as the copper pentavalent arsenic compound according to the present invention. Copper arsenate has a solubility product comparable to iron arsenate ($FeAsO_4$), and is a pentavalent arsenic compound that is easily formed in the weakly acidic to neutral region.

In this embodiment, copper sulfide is added to the solution containing trivalent arsenic with the initial pH value being set to 2 or more, and the oxidation reaction is started. Thus, the oxidation of the trivalent arsenic to pentavalent arsenic and the supply of copper ions by the dissolution of the copper sulfide occur simultaneously on the surface of the added copper sulfide, and therefore the generation of copper arsenate is though to occur instantaneously. When the reaction is complete, the solution is naturally transferred to the weakly acidic region. By this time, however, the pentavalent arsenic and the copper ions are both concentrated to the order of g/L. Due to this concentration, the generative capacity of the copper arsenate will not decrease.

At this point, unless the pH of the solution sinks below 1 into the acidic state, the forming capacity of the copper arsenate will not decrease significantly. Accordingly, it is preferable to control the pH.

(d) Reaction Temperature

The oxidation of arsenic is preferably performed at a higher solution temperature. Specifically, a temperature of 50° C. or more is required for the progress of the oxidation of arsenic. The solution is heated <5> to 70 to 90° C. and preferably about 80° C., inconsideration of real operation and based on the premise such as the material of the reaction tank and the filtering operation after the reaction.

(e) Blowing Gas Type and Blowing Amount

The oxidation reaction of trivalent arsenic is possible even when the blowing gas <6> is air. However, when oxygen gas or a gas mixture of air and oxygen gas is used as the blowing gas <6>, the oxidation speed is maintained even in the range where the arsenic concentration in the solution is low, and the blowing (gas) capacity decreases. As a result, heat loss associated with this is reduced, and the maintenance of the reaction temperature becomes easier. Therefore, it is preferable to use oxygen gas or a gas mixture of oxygen gas and air as the blowing gas <6>, in terms of the oxidation speed and the reaction temperature maintenance.

Regarding the blowing amount per unit time of the blowing gas <6>, its optimum value changes depending on the gas-liquid mixing state in the reaction tank. For example, by using a microscopic bubble generation apparatus and the like, the oxidation efficiency can be further improved, and the blowing amount can be reduced.

Therefore, at the time of real operation, it is important to find the optimum value in consideration of the gas-liquid mixing state, the oxygen gas blowing method, and the like.

3. pH of Trivalent Arsenic at the Beginning of the Oxidation Reaction

A basic equation of the oxidation reaction of trivalent arsenic according to the present invention is thought to be the following.

$As_2O_3 + H_2O = 2HAsO_2$ (Equation 19): Reaction in which diarsenic trioxide dissolves in water as arsenous acid (trivalent arsenic).

$$2HAsO_2 + O_2 + 2H_2O = 2H_2AsO_4^- + 2H^+ \quad \text{(Equation 20)}$$

Reaction in which arsenous acid (trivalent arsenic) oxides.

$$2HAsO_2 + O_2 + 2H_2O = 2H_2AsO_4 \quad \text{(Equation 21)}$$

Reaction in which arsenous acid (trivalent arsenic) oxides.

As in the examples described later, in the case of the concentrated solution whose arsenous acid concentration at the time of complete arsenic dissolution is 40 g/L or more, the solubility of arsenous acid is small, and therefore diarsenic trioxide does not dissolve totally in the initial stage.

In the case of the concentrated arsenic solution, simultaneously with the oxidation of arsenous acid to arsenate of high solubility according to (Equation 20) and (Equation 21) and the decrease of the arsenous acid concentration, the reaction in which arsenous acid is added into the system is thought to proceed. In other words, the solid diarsenic trioxide is thought to dissolve while being suspended in (Equation 19) the initial stage of the reaction.

At this point, the oxidation of arsenous acid to arsenate is thought to be in accordance with (Equation 20) and (Equation 21).

In the oxidation reaction of arsenous acid to arsenate, the behavior in which the pH of the solution rapidly decreases to about 2 is shown in initial 30 minutes. From this behavior, it can be estimated that the oxidation mainly proceeds according to (Equation 20) in the neutral region where the pH is 2 or more. Meanwhile, the decrease of the pH becomes gradual in the subsequent 30 minutes, and so it can be estimated that the reaction mainly proceeds according to (Equation 21).

In view of the above, it can be understood that the efficient oxidation of trivalent arsenic and the control of the pH at the stop of the reaction to the weakly acidic state according to the present invention can be achieved by setting the pH at the beginning of the oxidation reaction (when the air and/or oxygen gas blowing starts) to 2 or more.

4. pH of Trivalent Arsenate at the Stop of the Oxidation Reaction

In this embodiment according to the present invention, the pH of trivalent arsenate at the stop of the oxidation reaction (when the air and/or oxygen gas blowing stops) was below 2 and more specifically about 1.8 in all cases, as shown by the results of Examples 2 to 6 described later.

This pH of about 1.8 is a preferable pH for producing a pentavalent arsenic compound (the acid concentration is at an adequate level). This is because the optimum pH range for producing iron arsenate which is a pentavalent arsenic compound is pH=3.5 to 4.5, and so the neutralizing agent consumed for neutralizing acid content can be reduced.

On the other hand, in the production of scorodite ($FeAsO_4 \cdot 2H_2O$), the pentavalent arsenic solution whose pH is about 1 is used as the stock solution, and therefore the pH can be adjusted by adding a small amount of inverse neutralizing agent (for example, sulfuric acid). Furthermore, the pH at the stop of the reaction is preferably not less than 1 and below 2, though the details will be described in Example 6 below.

The pH at the stop of the trivalent arsenic oxidation reaction (when the air and/or oxygen blowing stops) being below 2 and specifically about 1.8 is thought to be derived from the above (Equation 19) to (Equation 21).

First, according to (Equation 19), diarsenic trioxide is dissolved in water as arsenous acid (trivalent arsenic). Furthermore, this is not limited to the case where the starting row material is the solid diarsenic trioxide, but also applies to the case of the aqueous solution in which arsenic trioxide has already been dissolved as arsenous acid (therefore, the present invention is thought to be applicable to ordinary drainage treatment).

The product obtained in the above oxidation step <4> is separated in the filtering <7> into the filtrate <8> and the filtrand <9>. In the filtering <7>, an ordinary filtering method such as filter press can be applied. This is because, though a copper pentavalent arsenic compound is generated in teh above oxidation step <4>, there is no problem of filterbility such as increased viscosity.

The obtained filtrate <7> is an arsenate solution having a pH of about 1.8 as mentioned above. Since the pH of about 1.8 is preferable for producing pentavalent arsenic compounds, a pentavalen arsenic compound can be produced from the filtrate <7> with low costs and high productivity.

On the other hand, the filtrand <9> is a mixture of copper sulfide and a copper pendavalent arsenic compound, and accordingly can be repeatedly used as it is as an oxidation catalyst. When repeatedly using this, the catalyst effect can be expected to increase by newly adding copper sulfide of an amount equivalent to partially dissolved copper sulfide.

5. Trivalent Arsenic Oxidation Reaction Mechanism Model

The ternary catalyst made up of copper sulfide, copper ions, and a copper pentavalent arsenic compound according to the present invention has both a high oxidation rate and a high oxidation speed. The oxidation catalyst effects exhibited by this ternary catalyst is thought to be derived from the battery-like reaction caused by the contact of each type of ions on the copper sulfide surface.

For example, consider the model of the oxidation reaction mechanism using the region of about pH=2 as an example.

First, substituting the trivalent arsenic oxidation to electrode reactions yields (Equation 22) showing the anodic reaction and (Equation 23) showing the cathodic reaction.

$$As_2O_3 + 5H_2O = 2H_3OAsO_4 + 4H^+ + 4e^- \quad \text{(Equation 22)}$$

$$4H^+ + O_2 + 4e^- = 2H_2O \quad \text{(Equation 23)}$$

In other words, the oxidation reaction of trivalent arsenic proceeds as shown in (Equation 22), but it is necessary to maintain electrical neutralization in order to have the reaction proceed. Therefore, the reactivity depends on the progress of the cathodic reaction shown in (Equation 23) which proceeds on the copper sulfide surface. Due to this, it is thought to be important to secure the copper sulfide surface which always has a high activation level.

Which is to say, in the present reaction model system, copper ions coexist and also the reaction occurs in the weakly acidic pH region, and therefore the crystallizing reaction of the copper sulfide compound as shown in (Equation 24) is thought to occur on the copper sulfide surface.

$$Cu^{2+} + H_3AsO_4 + H_2O = CuHAsO_4 \cdot H_2O + 2H^+ \quad \text{(Equation 24)}$$

According to (Equation 24), it can be considered that hydrogen ions ($H^+$) are added to the copper sulfide surface and the reactions shown in (Equation 25) and (Equation 26) proceed simultaneously.

$$CuS + 2H^+ + 1/2 O_2 = Cu^{2+} + S^\circ + H_2O \quad \text{(Equation 25)}$$

$$CuS + H^+ + 2O_2 = Cu^{2+} + HSO_4^- \quad \text{(Equation 26)}$$

At this time, the copper arsenate compound is formed on the copper sulfide surface, so that the oxygen gas supply becomes insufficient and (Equation 25) the S° (monatomic sulfur) generating reaction as shown in (Equation 25) is likely to proceed. Further, with the progress of the reactions shown in (Equation 25) and (Equation 26), it is estimated that the Cu ion concentration increases locally and also the hydrogen ion (H⁺) concentration decreases. At this location, the copper sulfide generating reaction shown in (Equation 27) is thought to proceed simultaneously with the above reactions shown in (Equation 25) and (Equation 26).

$$Cu^{2+}+4/3S^{\circ}+4/3H_2O=CuS+1/3HSO_4^-+7/3H^+ \quad \text{(Equation 27)}$$

(Equation 27) shows the crystallization of CuS which is copper sulfide, and indicates that the CuS crystallization is ensured on the copper sulfide surface as the newly-formed surface of high activity.

Furthermore, the hydrogen ions (H⁺) generated in (Equation 27) are supplied to the reactions shown in (Equation 25) and (Equation 26), and also consumed in the dissolution reaction of the copper arsenate compound (the inverse reaction of (Equation 24)). As a result, the addition of copper ions to the copper sulfide surface and the dispersion of arsenic acid ($H_3AsO_4$) to the periphery are thought to proceed.

Note, in the condition of pH=0 shown in Comparative Example 5 below, basically the reaction shown in (Equation 24) does not proceed and the reaction shown in (Equation 27) does not proceed easily, and so it is interpreted that the oxidation efficiency drops significantly.

EXAMPLES

Example 2

Diarsenic trioxide of reagent grade (the grade is shown in Table 6) and copper sulfide of reagent grade (the grade is shown in Table 7) were prepared.

As described above, copper sulfide can be mainly classified into the two forms of CuS and $Cu_2S$, and there is also a composition $Cu_9S_5$ in which a portion of copper in crystal lattice is defective. Any of these forms is usable, and a mixture of these forms is applicable too.

The results of X-ray diffraction of copper sulfide used in this example are shown in FIG. 3. Note, in FIG. 3, the peak of CuS is plotted as Δ, the peak of $Cu_2S$ is plotted as *, and the peak of $Cu_9S_5$ is plotted as ♦. From the results of X-ray diffraction, the copper sulfide used in this example is thought to be the mixture of CuS, $Cu_2S$, and $Cu_9S_5$.

TABLE 6

| arsenic (%) | sulfur (ppm) | copper (ppm) | zinc (ppm) | lead (ppm) | cadmium (ppm) |
|---|---|---|---|---|---|
| 74.8 | 1,303 | 27 | 11 | 60 | 2 |

TABLE 7

| copper (%) | sulfur (%) | zinc (ppm) | lead (ppm) | cadmium (ppm) |
|---|---|---|---|---|
| 71.2 | 26.1 | 29 | 2 | 1 |

A 1 L beaker was used as the reaction vessel, a 2-stage turbine blade and 4 baffle plates of 700 rpm were used as the mixture device, and the gas blowing was conducted by blowing in oxygen gas using a glass tube from the bottom of the beaker (the oxidation was performed in a gas and liquid mixture in vigorous mixing).

50 g of diarsenic trioxide and 48 g of copper sulfide were introduced in the reaction vessel, 800 cc of pure water was added to repulp, and the solution was heated to 80° C. Next, the mixture of the solution was started using the mixture device, and further the blowing of oxygen gas from the bottom of the reaction vessel was started at 400 cc/min, to oxidize trivalent arsenic. Note, the pH of the solution immediately before the oxygen gas blowing start was 3.09 (at 80° C.).

The solution mixture and the oxygen gas blowing were continued for 90 minutes to oxidize the trivalent arsenic. The temperature, pH, redox potential, copper ion amount, trivalent arsenic amount, and pentavalent arsenic amount of the solution were measured every 30 minutes. The measurement results are shown in Table 8. Note, the redox potential is Ag/AgCl reference electrode value.

TABLE 8

| Elapsed time (minutes) | 30 | 60 | 90 |
|---|---|---|---|
| Temperature (° C.) | 79 | 79 | 79 |
| pH | 2.13 | 1.88 | 1.84 |
| Redox potential (mV) | 298 | 327 | 383 |
| $Cu^{2+}$ (g/L) | 1.8 | 4.0 | 5.6 |
| Trivalent arsenic (g/L) | 29.2 | 8.3 | 0.2 |
| Pentavalent arsenic (g/L) | 13.9 | 33.2 | 40.7 |
| Oxidation rate (%) | 32.3 | 80.0 | 99.5 |

After the oxidation of the trivalent arsenic was continued for 90 minutes, the solution was filtered, the catalyst recovered as the residue was washed with water, and the grade analysis and X-ray diffraction of the catalyst were performed. The grade analysis results and X-ray diffraction results of the catalyst after the reaction are shown in Table 9 and FIG. 4, respectively. In FIG. 4, the peak of Cu is plotted by Δ, and the peak of the copper pentavalent arsenic compound is plotted by ○.

TABLE 9

| copper (%) | sulfur (%) | arsenic (%) |
|---|---|---|
| 54.2 | 22.6 | 10.5 |

From Table 8, Table 9, and FIG. 4, it can be understood that copper sulfide, copper ions, and a copper pentavalent arsenic compound (copper arsenate) coexist in the reaction system according to this example 2.

Moreover, it can be understood that the oxidation speed and the oxidation rate of the trivalent arsenic are high in this example 2. In particular, it was confirmed that the oxidation rate of 99%, or more was already reached at the point of 90 minutes after the oxidation reaction start.

Example 3

The same operations and measurements as in Example 2 were performed except that the amount of copper sulfide introduced in the reaction vessel was 24 g which is one half.

Note, the pH of the solution immediately before the oxygen gas blowing start was 2.96 (at 80° C.).

The results of measuring the temperature, pH, redox potential, copper ion amount, trivalent arsenic amount, and pentavalent arsenic amount of the solution every 30 minutes are shown in Table 10, and the analysis results of the grade of the catalyst recovered as the residue and washed with water are shown in Table 11.

TABLE 10

| | Elapsed time (minutes) | | | |
|---|---|---|---|---|
| | 30 | 60 | 90 | 120 |
| Temperature (° C.) | 79 | 80 | 80 | 80 |
| pH | 2.17 | 1.88 | 1.80 | 1.79 |
| Redox potential (mV) | 301 | 317 | 336 | 384 |
| $Cu^{2+}$ (g/L) | 1.1 | 2.1 | 3.1 | 4.5 |
| Trivalent arsenic (g/L) | 32.6 | 21.3 | 7.4 | 0.3 |
| Pentavalent arsenic (g/L) | 11.4 | 24.1 | 38.0 | 45.6 |
| Oxidation rate (%) | 25.9 | 53.1 | 83.7 | 99.4 |

TABLE 11

| copper (%) | sulfur (%) | arsenic (%) |
|---|---|---|
| 63.4 | 29.4 | 2.3 |

In Example 3, the CuS additive amount is reduced by half of Example 2, to examine the effects of this reduction by half.

As a result, the oxidation speed of trivalent arsenic decreased a little when compared with Example 2, but the oxidation capacity was sufficiently maintained, and the oxidation of 99% or more was observed at the point of 120 minutes after the oxidation reaction start. As with Example 2, the oxidation capacity and speed of trivalent arsenic can both be considered favorable for practical use.

Example 4

This example is similar to Example 2, but further 16 g of copper sulfide of reagent grade ($CuSO_4.5H_2O$) was introduced into the reaction vessel. The amount of copper sulfide introduced is equivalent to 5 g/L as copper ions. This example relates to the case of increasing the copper ion concentration than in the initial stage of the reaction.

Note, the pH of the solution immediately before the oxygen gas blowing start was 2.98 (at 80° C.).

The results of measuring the temperature, pH, redox potential, copper ion amount, trivalent arsenic amount, and pentavalent arsenic amount of the solution every 30 minutes are shown in Table 12.

In this example, the oxygen gas blowing was stopped at 120 minutes when the reaction ended. After this, a NaOH solution of concentration 500 g/L was added to neutralize the solution to pH=3.5, copper ions existing in the solution were crystallized as a pentavalent arsenic compound, and then the filtering operation was performed. Note, the additive amount of the NaOH solution was 40 cc.

The total arsenic concentration in the filtrate obtained as a result of the filtering operation was 29.6 g/L, while the copper concentration was 80 mg/L. Thus, the concentration decrease associated with the formation of the copper arsenate compound was observed.

On the other hand, the residue recovered as a result of the filtering operation was 165 g·wet. Extracting 5 g·wet of this residue and measuring the moisture content produced the results that the moisture content=59.9%. In addition, 5 g·wet of the residue was washed with water and the grade was analyzed. The analysis results of the grade of the recovered residue are shown in Table 13.

TABLE 12

| | Elapsed time (minutes) | | | |
|---|---|---|---|---|
| | 30 | 60 | 90 | 120 |
| Temperature (° C.) | 79 | 79 | 80 | 80 |
| pH | 1.84 | 1.86 | 1.90 | 1.79 |
| Redox potential (mV) | 299 | 321 | 356 | 386 |
| $Cu^{2+}$ (g/L) | 6.1 | 8.0 | 10.1 | 10.9 |
| Trivalent arsenic (g/L) | 34.7 | 17.0 | 0.7 | 0.2 |
| Pentavalent arsenic (g/L) | 7.9 | 27.9 | 42.8 | 41.0 |
| Oxidation rate (%) | 18.5 | 62.2 | 98.5 | 99.5 |

TABLE 13

| copper (%) | sulfur (%) | arsenic (%) |
|---|---|---|
| 47.5 | 12.1 | 19.7 |

This example 4 increases the Cu ion concentration than in the initial stage of the reaction in Example 2. From the results of Table 12, it can be understood that the reaction was complete at a high oxidation rate in this example, too.

On the other hand, in Example 4, the oxidation speed decreased a little when compared with Example 2. This indicates that the copper ion concentration in the reaction system need not increased more than necessary. It can be judged that the sufficient copper ion concentration in the reaction system is approximately 1 to 5 g/L.

Furthermore, when using copper sulfide immediately after being produced by the wet sulfidation reaction, this copper sulfide has a behavior of poor solubility. In view of this, when using copper sulfide immediately after being produced by the wet sulfidation reaction, the addition of copper ions to the reaction system is effective.

Moreover, Example 4 recovers added copper ions as a copper pentavalent arsenic compound by neutralization. The method of recovering copper ions is not limited to the method of recovering as a copper pentavalent arsenic compound, and may instead be a method of adding an agent that reacts with copper ions and forms copper sulfide, such as monatomic sulfur or ZnS.

Example 5

50 g of diarsenic trioxide of reagent grade was prepared.

The whole residue recovered in Example 4 (except 10 g·wet used for the measurement sample in Example 4) and 50 g of diarsenic trioxide were introduced into the reaction vessel, and 707 cc of pure water was added to repulp, to bring the moisture content in the pulp to be 800 cc. This pulp was heated to 80° C., and then oxygen gas was started to be blown in from the bottom of the reaction vessel at 400 cc/min.

Note, the pH of the solution immediately before the oxygen gas blowing start was 3.03 (at 79° C.).

The results of measuring the temperature, pH, redox potential, copper ion amount, trivalent arsenic amount, and pentavalent arsenic amount of the solution every 30 minutes are shown in Table 14.

TABLE 14

|  | Elapsed time (minutes) | | |
| --- | --- | --- | --- |
|  | 30 | 60 | 90 |
| Temperature (° C.) | 80 | 80 | 79 |
| pH | 2.20 | 1.90 | 1.83 |
| Redox potential (mV) | 294 | 349 | 382 |
| $Cu^{2+}$ (g/L) | 2.2 | 3.2 | 4.7 |
| Trivalent arsenic (g/L) | 24.2 | 2.4 | 0.2 |
| Pentavalent arsenic (g/L) | 24.4 | 48.5 | 52.3 |
| Oxidation rate (%) | 50.2 | 95.3 | 99.6 |

After the reaction for 90 minutes, the oxygen gas blowing was stopped, a NaOH solution of concentration 500 g/L was added to neutralize the solution to pH=3.0, and then the solution was filtered. Note, the amount of the NaOH solution used was 36 cc.

The total arsenic concentration in the filtrate obtained was 44.8 g/L, while the Cu concentration was 210 mg/L. Thus, the recovery of the arsenic concentration approximately equivalent to the composition concentration was observed.

On the other hand, the residue recovered was 122 g·wet. Extracting 5 g·wet of this residue and measuring the moisture content produced the results that the moisture content=48.9%. In addition, 5 g·wet of the residue was washed with water and the grade was analyzed. The analysis results of the grade of the catalyst recovered as the residue are shown in Table 15.

TABLE 15

| copper (%) | sulfur (%) | arsenic (%) |
| --- | --- | --- |
| 44.4 | 10.6 | 21.8 |

This example 5 exhibited highest oxidation efficiency and a highest oxidation speed, in Examples 2 to 6. Specifically, the oxidation of 95% was already observed at the point of 60 minutes from the reaction, and the oxidation rate of 99.6% which is approximately 100% was observed at the point of 90 minutes from the reaction.

The catalyst according to this example 5 is the ternate catalyst of copper sulfide, copper ions, and a copper arsenate compound (copper pentavalent arsenic compound), too. The catalyst according to this example 5 especially has a high content ratio of the copper arsenate compound (copper pentavalent arsenic compound), compared to that of examples 2 and 3. This high content ratio of the copper arsenate compound is thought to contribute to the improved oxidation performance. In other words, as described in "Model of oxidation reaction" this contribution phenomenon demonstrates that the formation and presence of the copper arsenate compound relates to the generation of the newly-formed surface of CuS of high activity.

Example 6

The same operations as in Example 3 were performed except that the pH immediately before the oxygen gas blowing start was adjusted to 1.0 (at 80° C.) by adding concentrated sulfuric acid to the pulp.

The results of measuring the temperature, pH, redox potential, copper ion amount, trivalent arsenic amount, and pentavalent arsenic amount of the solution every 30 minutes are shown in Table 16. Moreover, the catalyst grade after the reaction (washed with water) are shown in Table 17.

TABLE 16

|  | Elapsed time (minutes) | | | |
| --- | --- | --- | --- | --- |
|  | 30 | 60 | 90 | 120 |
| Temperature (° C.) | 81 | 79 | 80 | 79 |
| pH | 1.22 | 1.15 | 1.15 | 1.13 |
| Redox potential (mV) | 363 | 371 | 375 | 380 |
| $Cu^{2+}$ (g/L) | 4.8 | 5.2 | 5.7 | 6.3 |
| Trivalent arsenic (g/L) | 33.6 | 24.4 | 17.6 | 12.8 |
| Pentavalent arsenic (g/L) | 10.9 | 21.2 | 28.2 | 33.4 |
| Oxidation rate (%) | 24.5 | 46.5 | 61.6 | 72.3 |

TABLE 17

| copper (%) | sulfur (%) | arsenic (%) |
| --- | --- | --- |
| 66.0 | 31.1 | 0.6 |

This example 6 is similar to Example 3 in the amount of copper sulfide added, but the pH of the solution immediately before the oxidation start was adjusted to 1.

As a result, the oxidation capacity decreased when compared with Example 3, and the oxidation rate was 72% at the point of 120 minutes. Though the reaction needs to be performed for a long period of time to reach the oxidation rate of 100%, the oxidation capacity itself is sufficient.

The reason of the above oxidation speed decrease can be attributed to the fact that the coexisting copper sulfide was significantly reduced. Furthermore, when the pH of the solution is 1, the amount of dissolution of copper sulfide increases, so that the amount of copper sulfide recovered without dissolving (amount of recycle) decreases, which is disadvantageous in terms of cost, too.

In view of the above, it is thought to be preferable to start the reaction by setting the pH of the solution to not less than 2 and ending the oxidation reaction with a pH of not less than 1, in terms of ensuring the reactivity and the CuS recovery amount.

Comparative Example 1

The same operation as in Example 2 was performed except that 50 g of diarsenic trioxide of reagent grade alone was introduced in the reaction vessel and 800 cc of pure water was added to repulp.

Note, the pH of the solution immediately before the oxygen gas blowing start was 2.80 (at 80° C.).

The temperature, pH, redox potential, copper ion amount, trivalent arsenic amount, and pentavalent arsenic amount of the solution were measured every 30 minutes. The measurement results are shown in Table 18.

TABLE 18

|  | Elapsed time (minutes) | | |
| --- | --- | --- | --- |
|  | 30 | 60 | 90 |
| Temperature (° C.) | 80 | 79 | 80 |
| pH | 2.71 | 2.68 | 2.67 |
| Redox potential (mV) | 378 | 373 | 370 |
| $Cu^{2+}$ (g/L) | <0.1 | <0.1 | <0.1 |
| Trivalent arsenic (g/L) | 42.0 | 44.0 | 45.5 |
| Pentavalent arsenic (g/L) | 0 | 0.1 | 0.4 |
| Oxidation rate (%) | 0 | 0.2 | 0.9 |

In this comparative Example 1, it was observed that the oxidation of trivalent arsenic proceeded little.

Comparative Example 2

The same operation as in Example 2 was performed except that 50 g of diarsenic trioxide of reagent grade and 16 g of copper sulfide of reagent grade ($CuSO_4 \cdot 5H_2O$) were introduced in the reaction vessel and 800 cc of pure water was added to repulp.

Note, the pH of the solution immediately before the oxygen gas blowing start was 3.33 (at 80° C.).

The temperature, pH, redox potential, copper ion amount, trivalent arsenic amount, and pentavalent arsenic amount of the solution were measured every 30 minutes. The measurement results are shown in Table 19.

TABLE 19

|  | Elapsed time (minutes) | | |
| --- | --- | --- | --- |
|  | 30 | 60 | 90 |
| Temperature (° C.) | 81 | 79 | 80 |
| pH | 3.22 | 3.16 | 3.10 |
| Redox potential (mV) | 373 | 378 | 382 |
| $Cu^{2+}$ (g/L) | 5.3 | 5.5 | 5.7 |
| Trivalent arsenic (g/L) | 40.3 | 43.6 | 45.3 |
| Pentavalent arsenic (g/L) | 0.5 | 0.9 | 1.3 |
| Oxidation rate (%) | 1.2 | 2.0 | 2.8 |

In this comparative Example 2, though the progress of oxidation was observed when compared with Comparative Example 1, but the degree of progress was still small.

Comparative Example 3

The same operation as in Example 2 was performed except that 50 g of diarsenic trioxide of reagent grade and 32 g of copper sulfide of reagent grade ($CuSO_4 \cdot 5H_2O$) (10 g/L as copper ions) were introduced in the reaction vessel and 800 cc of pure water was added to repulp.

Note, the pH of the solution immediately before the oxygen gas blowing start was 3.45 (at 81° C.)

The temperature, pH, redox potential, copper ion amount, trivalent arsenic amount, and pentavalent arsenic amount of the solution were measured every 30 minutes. The measurement results are shown in Table 20.

TABLE 20

|  | Elapsed time (minutes) | | |
| --- | --- | --- | --- |
|  | 30 | 60 | 90 |
| Temperature (° C.) | 79 | 81 | 79 |
| pH | 3.29 | 3.20 | 3.25 |
| Redox potential (mV) | 369 | 372 | 378 |
| $Cu^{2+}$ (g/L) | 10.7 | 10.6 | 10.8 |
| Trivalent arsenic (g/L) | 39.5 | 42.5 | 43.4 |
| Pentavalent arsenic (g/L) | 2.5 | 3.0 | 3.5 |
| Oxidation rate (%) | 6.0 | 6.6 | 7.4 |

In this comparative Example 3, the progress of oxidation was observed as a result of increasing the Cu ion concentration in the solution. However, the degree of progress of oxidation was still small, and further addition of copper ions is thought to be necessary. Hence Comparative Example 3 is not suitable for practical use.

Comparative Example 4

The same operation as in Example 2 was performed except that 50 g of diarsenic trioxide of reagent grade, 48 g of copper sulfide of reagent grade (CuS), and 20 g of sulfur powder were introduced in the reaction vessel and 800 cc of pure water was added to repulp.

Note, the pH of the solution immediately before the oxygen gas blowing start was 2.67 (at 80° C.).

The temperature, pH, redox potential, copper ion amount, trivalent arsenic amount, and pentavalent arsenic amount of the solution were measured every 30 minutes. The measurement results are shown in Table 21.

TABLE 21

|  | Elapsed time (minutes) | | |
| --- | --- | --- | --- |
|  | 30 | 60 | 90 |
| Temperature (° C.) | 79 | 79 | 81 |
| pH | 1.75 | 1.65 | 1.63 |
| Redox potential (mV) | 340 | 341 | 343 |
| $Cu^{2+}$ (g/L) | <0.1 | <0.1 | <0.1 |
| Trivalent arsenic (g/L) | 35.2 | 35.3 | 35.4 |
| Pentavalent arsenic (g/L) | 10.4 | 10.7 | 10.9 |
| Oxidation rate (%) | 22.8 | 23.3 | 23.5 |

After the end of the reaction, the solution was filtered, the obtained residue was washed with water, and the grade analysis and X-ray diffraction were performed. The catalyst grade after the reaction (washed with water) is shown in Table 22, and the X-ray diffraction results are shown in FIG. 5.

In FIG. 5, the peak of CuS is plotted by Δ, and the peak of sulfur is plotted by ■.

In the grade analysis, 0.1% arsenic was detected, but this can be considered to result from the unwashed solution adhesion.

From FIG. 5 and Table 22, it can be understood that there is no presence of copper ions and a copper pentavalent arsenic compound in this comparative Example 4 to a single catalyst system of copper sulfide.

TABLE 22

| copper (%) | sulfur (%) | arsenic (%) |
| --- | --- | --- |
| 49.5 | 50.0 | 0.1 |

In this comparative Example 4, the progress of oxidation was observed. This indicates that single copper sulfide has a higher oxidation capacity as a catalyst than single Cu ions used in Comparative Examples 2 and 3. However, the degree of progress of oxidation is still not appropriate in terms of practical use.

Comparative Example 5

The same operation as in Example 2 was performed except that concentrated sulfuric acid was added to pulp, the pH was adjusted to 0 (at 80° C.), and then the oxygen gas, blowing was started.

The temperature, pH, redox potential, copper ion amount, trivalent arsenic amount, and pentavalent arsenic amount of the solution were measured every 30 minutes. The measurement results are shown in Table 23.

TABLE 23

| | Elapsed time (minutes) | | | |
|---|---|---|---|---|
| | 30 | 60 | 90 | 120 |
| Temperature (° C.) | 80 | 79 | 80 | 80 |
| pH | 0.00 | 0.00 | −0.02 | −0.04 |
| Redox potential (mV) | 411 | 415 | 412 | 411 |
| $Cu^{2+}$ (g/L) | 9.7 | 10.8 | 11.2 | 11.5 |
| Trivalent arsenic (g/L) | 32.7 | 31.9 | 32.6 | 31.6 |
| Pentavalent arsenic (g/L) | 1.7 | 2.8 | 3.5 | 4.8 |
| Oxidation rate (%) | 4.9 | 8.0 | 9.7 | 13.1 |

After the end of the reaction, the solution was filtered, the obtained residue was washed with water, and the grade analysis and X-ray diffraction were performed. The catalyst grade after the reaction (washed with water) is shown in Table 24, and the X-ray diffraction results are shown in FIG. 6. In FIG. 6, the peak of CuS is plotted by Δ, and the peak of diarsenic trioxide is plotted by □.

TABLE 24

| copper (%) | sulfur (%) | arsenic (%) |
|---|---|---|
| 56.2 | 28.9 | 10.6 |

In this comparative Example 5, the oxidation of arsenic did not progress, and 10.6% arsenic was detected even in the catalyst after the reaction. Moreover, since diarsenic trioxide was acknowledged from the X-ray diffraction results as shown in FIG. 6, it can be understood that the diarsenic trioxide remained without dissolving even after the oxidation reaction.

This is thought to be because the solubility of diarsenic trioxide decreased since the oxidation reaction was started in the sulfuric acidified solution having a pH of 0, and also because trivalent arsenic eluted into the solution remains without being oxidized to pentavalent arsenic of high solubility and therefore the trivalent arsenic concentration in the solution did not decrease and a portion of diarsenic trioxide remains without dissolving.

The results of this comparative Example 5 indicate that, when starting the arsenic oxidation reaction under a condition where the pH is 0 which does not allow formation of copper sulfide, the substances that serve as catalysts are the binary system of copper sulfide and copper ions, which results in a significant drop of the oxidation capacity. This demonstrates that the arsenic oxidation reaction according to the present invention is preferably started under a condition where the pH is not less than 1.

Figure 1:
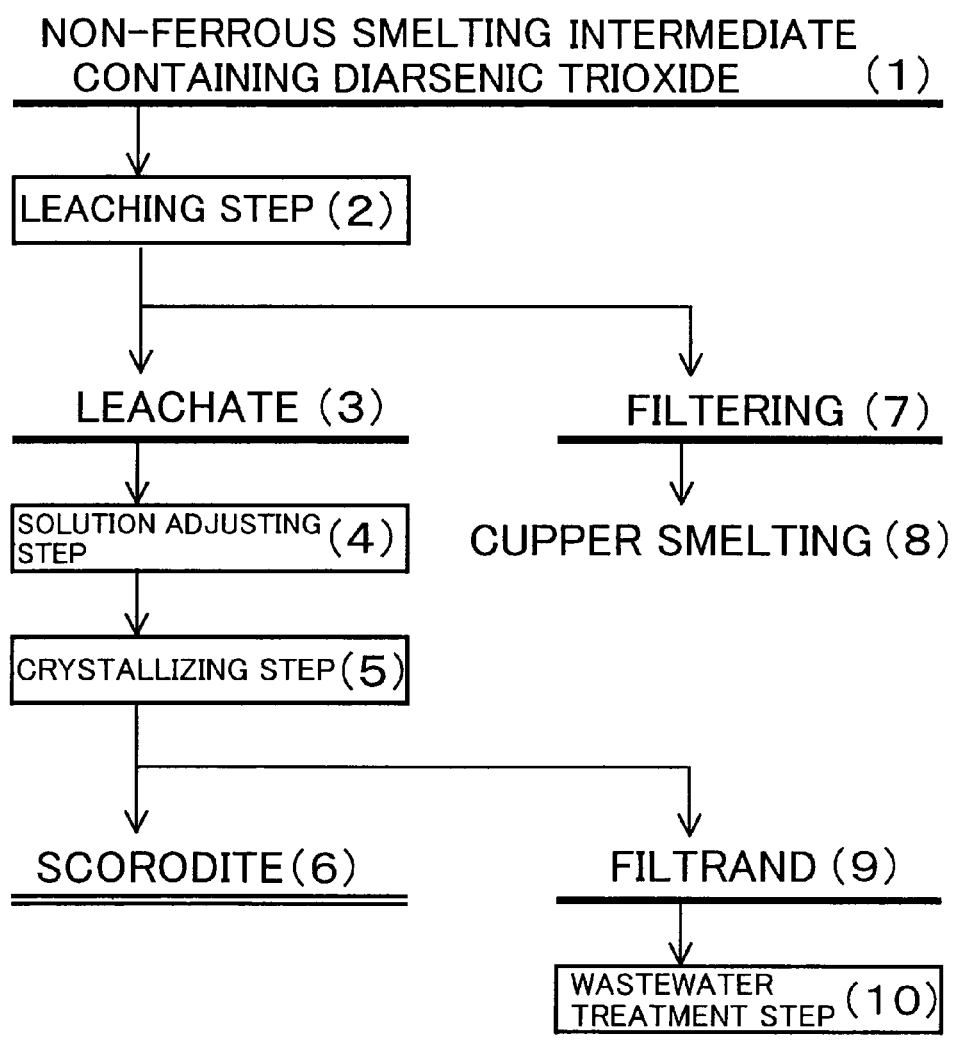
FIG. 1 is a flowchart showing a method of processing arsenic according to the present invention.
Figure 2:
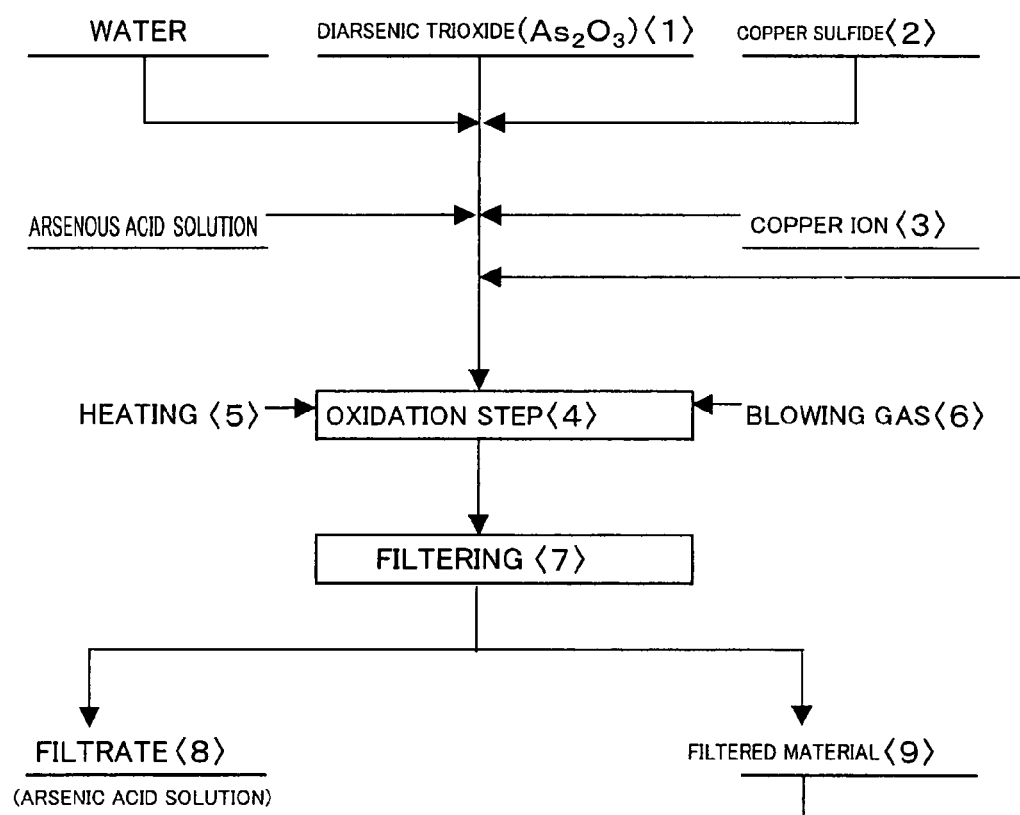
FIG. 2 is a flowchart according to an embodiment (second embodiment) of the present invention.
Figure 3:
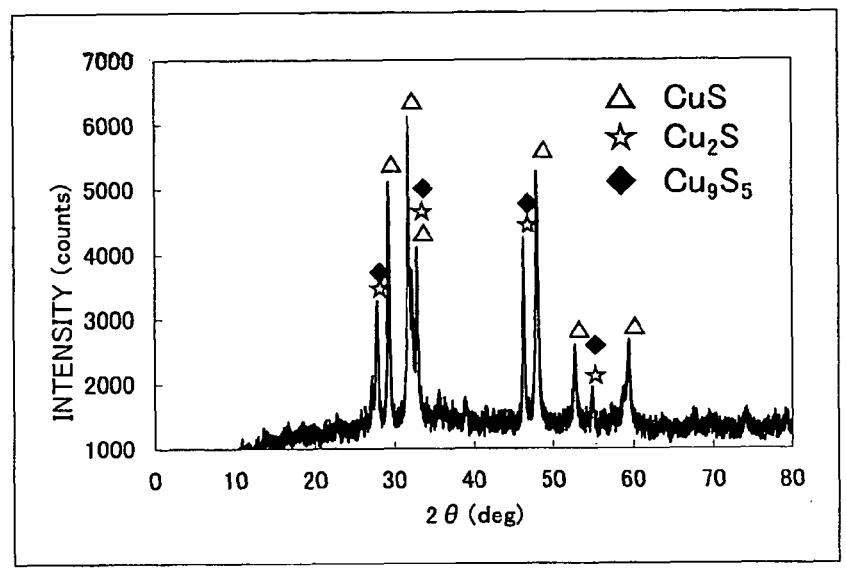
FIG. 3 shows the X-ray diffraction results of copper sulfide in Example 2.
Figure 4:
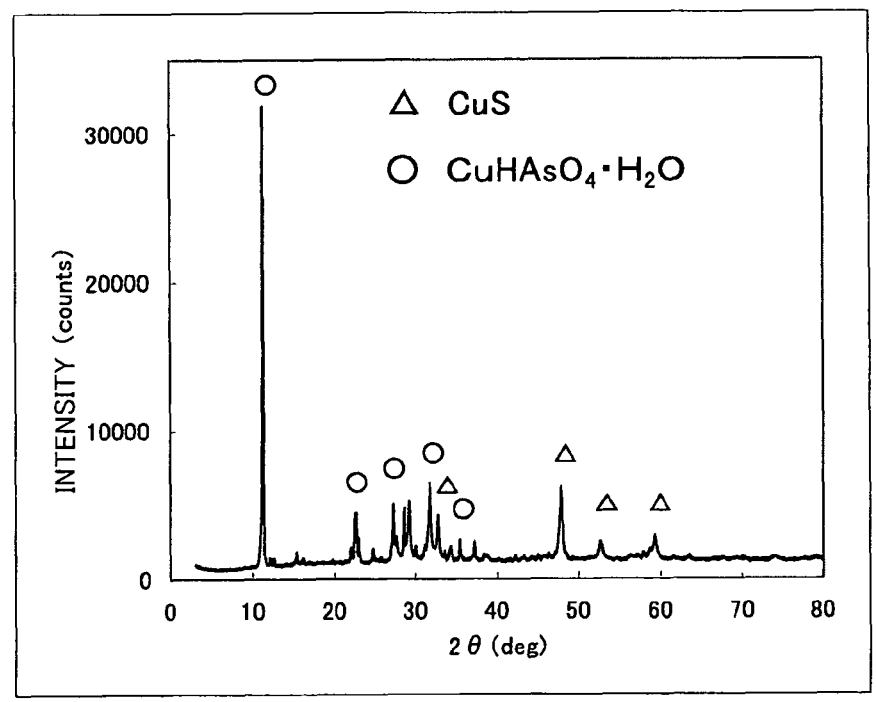
FIG. 4 shows the X-ray diffraction results of the residue in Example 2.
Figure 5:
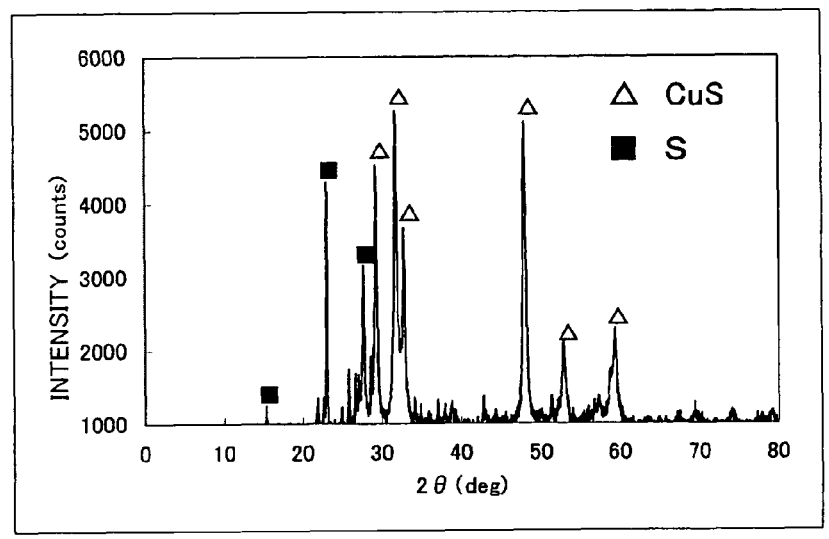
FIG. 5 shows the X-ray diffraction results of the residue in Comparative Example 4.
Figure 6:
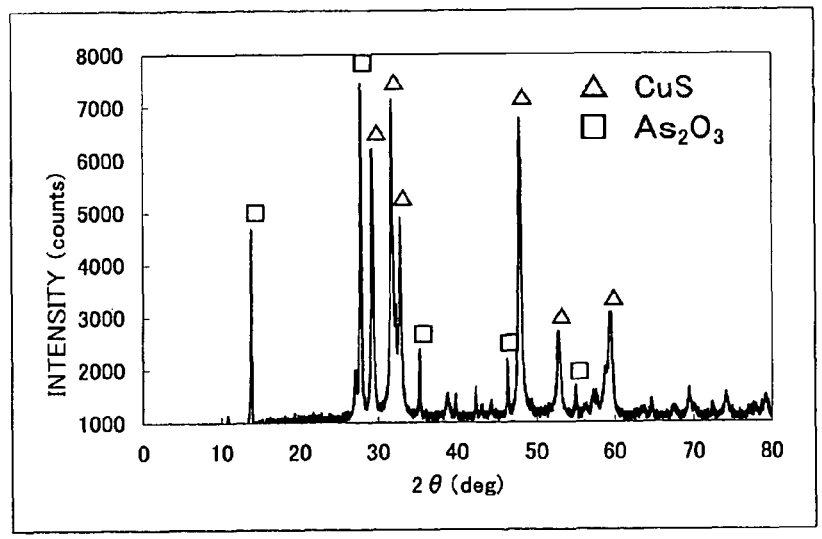
FIG. 6 shows the X-ray diffraction results of the residue in Comparative Example 5.

The invention claimed is:

1. A method of processing a substance that contains diarsenic trioxide and heavy metal, comprising:
    a leaching step of adding water and NaOH to a non-ferrous smelting intermediate that contains diarsenic trioxide and heavy metal to produce slurry, heating the slurry, and leaching arsenic at a pH of not less than 8 so as to obtain leachate;
    a solution adjusting step of adding hydrogen peroxide to the leachate to oxidize trivalent arsenic to pentavalent arsenic so as to obtain an adjusted solution; and
    a crystallizing step of converting arsenic in the adjusted solution to scorodite crystals,
    wherein hydrogen peroxide remaining in the adjusted solution is removed by bringing the remaining hydrogen peroxide into contact with metallic copper.

2. The method of processing a substance that contains diarsenic trioxide and heavy metal according to claim 1, wherein the crystallizing step converts arsenic in the adjusted solution to scorodite crystals by adding and dissolving ferrous salt into the adjusted solution to oxidize the ferrous salt.

3. The method of processing a substance that contains diarsenic trioxide and heavy metal according to claim 2, wherein one of air and oxygen or mixed gas thereof is blown into the adjusted solution to oxidize the ferrous salt.

4. The method of processing a substance that contains diarsenic trioxide and heavy metal according to claim 1, wherein the crystallizing step is performed at a pH of not more than 1 adjusted by adding a sulfuric acid to the adjusted solution.

5. The method of processing a substance that contains diarsenic trioxide and heavy metal according to claim 1, wherein the crystallizing step is performed at 50° C. or higher.

* * * * *